(12) United States Patent
Li et al.

(10) Patent No.: US 12,307,304 B1
(45) Date of Patent: May 20, 2025

(54) DATA RESOURCE HEALTH MAINTENANCE METHOD AND APPARATUS, AND DEVICE

(71) Applicant: Beijing Volcano Engine Technology Co., Ltd., Beijing (CN)

(72) Inventors: Yaohua Li, Beijing (CN); Wenchi Zhang, Beijing (CN); Wenjie Li, Beijing (CN); Chao Cui, Beijing (CN); Hongbin Liu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/939,286

(22) Filed: Nov. 6, 2024

(30) Foreign Application Priority Data

Nov. 7, 2023 (CN) .......................... 202311473632.5

(51) Int. Cl.
*G06F 9/46* (2006.01)
*G06F 9/50* (2006.01)

(52) U.S. Cl.
CPC ...... *G06F 9/5077* (2013.01); *G06F 2209/508* (2013.01)

(58) Field of Classification Search
CPC .................................................... G06F 9/5077
USPC ......................................................... 718/104
See application file for complete search history.

(56) References Cited

U.S. PATENT DOCUMENTS

| | | | | |
|---|---|---|---|---|
| 10,313,211 B1 * | 6/2019 | Rastogi | ............... | H04L 41/5009 |
| 11,159,402 B1 * | 10/2021 | Subramanian | ...... | H04L 43/0876 |
| 11,716,346 B1 * | 8/2023 | Kraemer | ................ | H04L 63/20 |
| 11,991,059 B1 * | 5/2024 | Gambhir | ............... | H04L 43/065 |
| 2006/0161883 A1 * | 7/2006 | Lubrecht | ................ | G06Q 10/06 717/104 |
| 2011/0191138 A1 * | 8/2011 | Saraf | .................. | G06Q 10/0635 706/54 |
| 2014/0157061 A1 * | 6/2014 | Bird | ...................... | G06F 11/079 714/47.1 |
| 2014/0157063 A1 * | 6/2014 | Bird | ...................... | G06F 11/008 714/47.3 |

(Continued)

FOREIGN PATENT DOCUMENTS

| | | |
|---|---|---|
| CN | 112925650 A | 6/2021 |
| CN | 112995201 B | 7/2022 |
| CN | 116611910 A | 8/2023 |

*Primary Examiner* — Mehran Kamran
(74) *Attorney, Agent, or Firm* — Alleman Hall & Tuttle LLP

(57) ABSTRACT

The present application discloses a data resource health maintenance method and apparatus, and a device. The data resource includes data computing resource and data storage resource. The method includes: obtaining a health assessment indicator for assessing health of the data resource, wherein the health assessment indicator includes a resource effective utilization degree and a resource risk level of the data resource in a use process; determining a weight corresponding to the resource effective utilization degree and a weight corresponding to the resource risk level; obtaining a health assessment result of the data resource based on the resource effective utilization degree, the resource risk level, the weight corresponding to the resource effective utilization degree, and the weight corresponding to the resource risk level; and obtaining a data resource use event related to the health assessment result, and performing data resource governance based on the data resource use event.

18 Claims, 5 Drawing Sheets

(56) References Cited

U.S. PATENT DOCUMENTS

| | | | | |
|---|---|---|---|---|
| 2014/0157235 A1* | 6/2014 | Bird | ................ | G06F 11/008 |
| | | | | 717/121 |
| 2014/0164612 A1* | 6/2014 | Hillier | ................ | G06F 11/328 |
| | | | | 709/224 |
| 2017/0161503 A1* | 6/2017 | Seigel | ................ | H04L 63/1425 |
| 2017/0250891 A1* | 8/2017 | Brech | ................ | G06F 9/5038 |
| 2018/0026852 A1* | 1/2018 | Anderson | ........... | H04L 43/0805 |
| | | | | 709/224 |
| 2022/0066857 A1* | 3/2022 | Hendrickson | ........... | G06F 21/76 |
| 2022/0247776 A1* | 8/2022 | Hecht | ................ | H04L 63/205 |
| 2022/0345457 A1* | 10/2022 | Jeffords | ............. | G06F 21/6218 |
| 2023/0239303 A1* | 7/2023 | Hutelmyer | ......... | H04L 63/1425 |
| | | | | 726/4 |
| 2023/0244794 A1* | 8/2023 | Vadala | ................. | G06F 30/20 |
| | | | | 726/25 |
| 2024/0069998 A1* | 2/2024 | Chatterjee | ............ | G06F 9/5027 |
| 2024/0311218 A1* | 9/2024 | Haarsager | ........... | G06F 11/3495 |

\* cited by examiner

DATA RESOURCE HEALTH MAINTENANCE METHOD AND APPARATUS, AND DEVICE

CROSS-REFERENCE TO RELATED APPLICATION

This application claims priority to Chinese Patent Application No. 202311473632.5, filed on Nov. 7, 2023, which is incorporated herein by reference in its entirety as a part of this application.

TECHNICAL FIELD

The present application relates to the field of computer technologies, and in particular, to a data resource health maintenance method, a data resource health maintenance apparatus, and a device.

BACKGROUND

In a big data scenario, data-related services develop rapidly, and various service scenarios are implemented using cluster resources, for example, cluster hardware resources. Hardware may be used to build a service, undertake a computing task, and meet the requirements of various service scenarios. To ensure healthy use of the cluster hardware resources, health maintenance needs to be performed on the cluster hardware resources during the use process of the cluster hardware resources.

Currently, health maintenance of the cluster hardware resources may be performed manually, but manual costs are high.

SUMMARY

In view of this, the present application provides a data resource health maintenance method and apparatus, and a device.

The technical solutions provided in the present application are as follows:

In a first aspect, the present application provides a data resource health maintenance method, and the data resources includes data computing resource and data storage resource, and the method includes:
- obtaining a health assessment indicator for assessing health of the data resource, wherein the health assessment indicator includes a resource effective utilization degree and a resource risk level of the data resource in a use process, the resource effective utilization degree is used to indicate a degree to which the data resource is effectively used, the resource risk level is used to indicate a degree of negative impact of use of the data resource on a service, and the resource effective utilization degree is negatively correlated with a rising rate of the resource risk level;
- determining a weight corresponding to the resource effective utilization degree and a weight corresponding to the resource risk level;
- obtaining a health assessment result of the data resource based on the resource effective utilization degree, the resource risk level, the weight corresponding to the resource effective utilization degree, and the weight corresponding to the resource risk level; and
- obtaining a data resource use event related to the health assessment result, and performing data resource governance based on the data resource use event.

In a second aspect, the present application provides a data resource health maintenance apparatus, and the data resources includes data computing resource and data storage resource, and the apparatus includes:
- a first obtaining unit, configured to obtain a health assessment indicator for assessing health of the data resource, wherein the health assessment indicator includes a resource effective utilization degree and a resource risk level of the data resource in a use process, the resource effective utilization degree is used to indicate a degree to which the data resource is effectively used, the resource risk level is used to indicate a degree of negative impact of use of the data resource on a service, and the resource effective utilization degree is negatively correlated with a rising rate of the resource risk level;
- a determination unit, configured to determine a weight corresponding to the resource effective utilization degree and a weight corresponding to the resource risk level;
- a second obtaining unit, configured to obtain a health assessment result of the data resource based on the resource effective utilization degree, the resource risk level, the weight corresponding to the resource effective utilization degree, and the weight corresponding to the resource risk level; and
- a third obtaining unit, configured to obtain a data resource use event related to the health assessment result, and performing data resource governance based on the data resource use event.

In a third aspect, the present application provides an electronic device, including:
- one or more processors; and
- a storage apparatus having one or more programs stored thereon,
- where the one or more programs, when executed by the one or more processors, cause the one or more processors to implement the data resource health maintenance method according to the first aspect.

In a fourth aspect, the present application provides a computer-readable storage medium having a computer program stored thereon, wherein the computer program, when executed by a processor, causes the data resource health maintenance method according to the first aspect to be implemented.

DETAILED DESCRIPTION

In order to make the above objectives, features, and advantages of the present application more obvious and understandable, the following further describes embodiments of the present application in detail with reference to the accompanying drawings and specific implementations.

Figure 1:
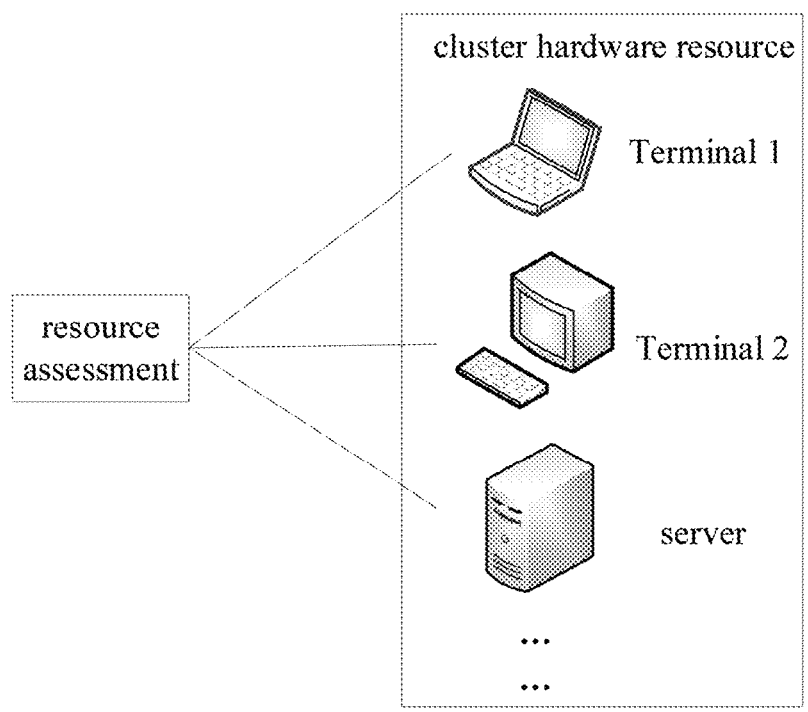
FIG. 1 is a schematic diagram of a framework of an exemplary application scenario according to an embodiment of the present application.

To facilitate understanding of the data resource health maintenance method provided in the embodiments of the present application, the following describes the method regarding a scenario example shown in FIG. 1. FIG. 1 is a schematic diagram of a framework of an exemplary application scenario according to an embodiment of the present application.

As shown in FIG. 1, a cluster may include devices such as the terminal 1, the terminal 2, and a server shown in FIG. 1. The terminal may be a terminal device such as a smartphone, a tablet computer, a notebook computer, or a desktop computer, which is not limited here. In addition, the quantity of terminal 1, terminal 2, and the server in the cluster is not limited and may be determined according to an actual situation. The cluster hardware resources are specifically resources in the terminal 1, the terminal 2, the server, and the like in the cluster. The cluster hardware resources specifically include various resources such as memory, a central processor, a disk, and a hard disk in terminal 1, terminal 2, the server, and the like that are used to build a service and undertake a computing task. Specifically, the implementation of a computing task in the cluster depends on computing by a processing hardware device such as a central processor, and data or other data generated by the computing task depends on storage by a storage hardware device such as a memory and a disk. The computing task, the stored data, and the like are all related to a service. For example, the computing task is a computing task built to implement the service, and the data is service-related data.

The data resource health maintenance method provided in the embodiments of the present application may be performed by an electronic device, and the electronic device is not limited here, and maybe a terminal device or a server, for example, a terminal device or a server in a cluster. The cluster hardware resources are used for data processing (such as data computing) and data storage. Therefore, the data resource may be used as a quantification result of the cluster hardware resource to represent the cluster hardware resources. The data resource is used by users, and in the process of using the data resource, the users need to assess the health of the data resource, to avoid a service problem caused by unhealthy data resource as much as possible.

Specifically, a health assessment indicator for assessing the health of the data resource is first determined, and the health assessment indicator includes a resource effective utilization degree and a resource risk level of the data resource in a use process. The resource effective utilization degree is used to indicate the degree to which the data resource is effectively used, and the resource risk level is used to indicate the degree of negative impact of the use of the data resource on a service.

The lower the resource effective utilization degree, the smaller the degree to which the data resource is effectively used, and the lower the health degree of the use of the data resource. The higher the resource risk level, the greater the degree of negative impact of the use of the data resource on the service, and the lower the health degree of the use of the data resource. In addition, the resource effective utilization degree affects a change in the resource risk level. The lower the resource effective utilization degree, the more data resource that is used invalidly or inefficiently, and the more likely it is to affect the service, so that the resource risk level increases faster. Therefore, the health of the data resource may be assessed based on the degree of effective use of the data resource and the degree of negative impact of the use of the data resource on the service.

Further, a weight corresponding to the resource effective utilization degree and a weight corresponding to the resource risk level are determined. The weights are used to indicate an impact proportion on the health assessment result of the data resource. Based on this, the health assessment result of the data resource is obtained based on the resource effective utilization degree, the resource risk level, the weight corresponding to the resource effective utilization degree, and the weight corresponding to the resource risk level.

Persons skilled in the art may understand that the schematic diagram of the framework shown in FIG. 1 is merely an example in which the implementation of the present application may be implemented. The scope of application of the implementation of the present application is not limited in any aspect by the framework.

To facilitate understanding of the present application, the following describes a data resource health maintenance method provided in an embodiment of the present application with reference to the accompanying drawings.

Figure 2:
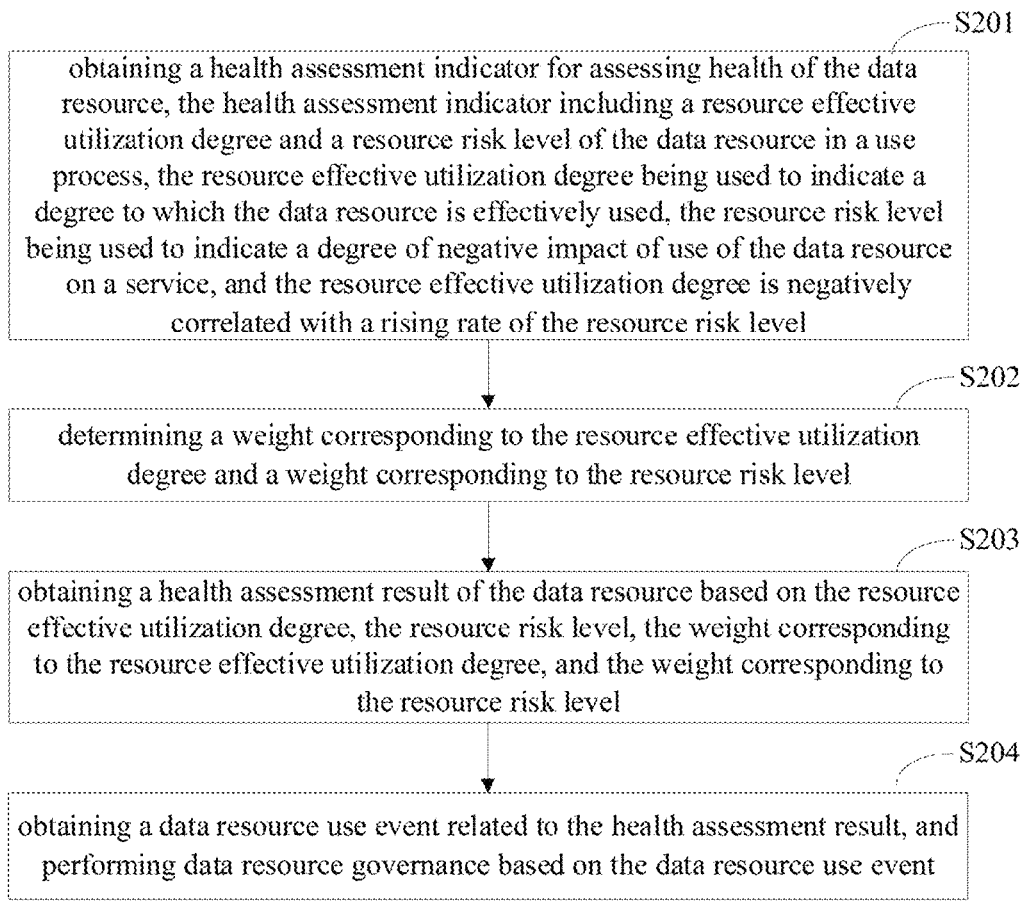
FIG. 2 is a flowchart of a data resource health maintenance method according to an embodiment of the present application.

As shown in FIG. 2, FIG. 2 is a flowchart of a data resource health maintenance method according to an embodiment of the present application. As shown in FIG. 2, the method may include S201 to S204:

S201: obtaining a health assessment indicator for assessing health of the data resource, the health assessment indicator including a resource effective utilization degree and a resource risk level of the data resource in a use process, the resource effective utilization degree being used to indicate a degree to which the data resource is effectively used, the resource risk level being used to indicate a degree of negative impact of use of the data resource on a service, and the resource effective utilization degree is negatively correlated with a rising rate of the resource risk level.

The data resource in this embodiment of the present application is used to represent cluster hardware resources, and the cluster hardware resources may be determined based on the dimension of a resource user. The resource user is a cluster hardware resource user. For example, the resource user may be a person, a department, or the like. Then, when the resource user is a department, the above cluster hardware resources are hardware resources in the department. Therefore, the health of the cluster hardware resources of each department may be assessed.

Figure 3:
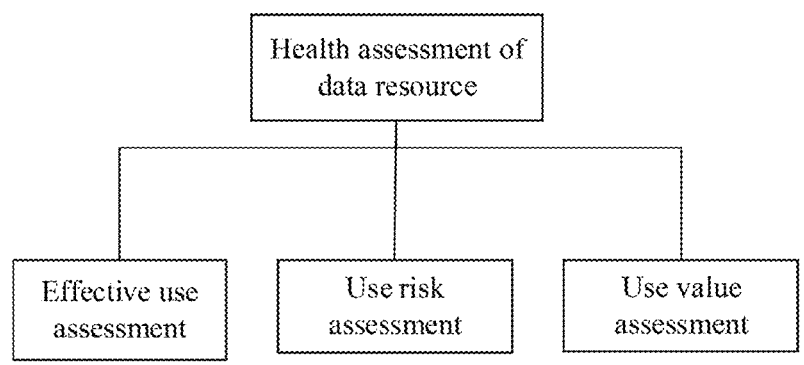
FIG. 3 is a schematic diagram of an example of an assessment direction of data resource health assessment according to an embodiment of the present application.

The health assessment indicator is an indicator set in this embodiment of the present application and used to assess a health degree of the data resource in a use process. Referring to FIG. 3, where FIG. 3 is a schematic diagram of an example of an assessment direction of data resource health assessment according to an embodiment of the present application. As shown in a part of FIG. 3, the data resource health assessment may include effective use assessment and use risk assessment of the data resource. For example, the effective use assessment of the data resource may be represented by the resource effective utilization degree of the data resource, and the use risk assessment of the data resource may be represented by the resource risk level of the data resource. The lower the resource effective utilization degree, the smaller the degree to which the data resource is effectively used, and the lower the health degree of the use of the data resource. The higher the resource risk level, the greater the degree of negative impact of the use of the data resource on the service, and the lower the health degree of the use of the data resource. In addition, the resource effective utilization degree affects a change in the resource risk level. It can be learned that the lower the resource effective utilization degree, the more data resource that is used invalidly or inefficiently, and the more likely it is to affect the service, so that the resource risk level rises faster.

This embodiment of the present application does not limit an effective degree threshold representing a resource effective degree in which the data resource is effectively used, or a level threshold representing a resource risk level in which the data resource is used with a low risk or no risk, and both may be set and modified according to an actual situation. In addition, this embodiment of the present application does not limit a representation of the resource effective degree. For example, it may be represented by a value within 100, or may be represented by a percentage. This embodiment of the present application does not limit a representation of the resource risk level. For example, it may be represented by numbers 0, 1, and 2 (the larger the number, the higher the risk level and the higher the risk), or may be represented by letters L0, L1, and L2.

In this embodiment of the present application, the use of the data resource that conforms to a data resource use standard is the effective use of the data resource and non-high-risk use of the data resource. The data resource use standard is used to guide the healthy use of the data resource. The data resource use standard is predetermined, and the data resource use standard includes data resource use events for the healthy use of the data resource. The data resource use event refers to a related event of using the data resource in an electronic device, and the data resource includes data computing resource and data storage resource. The data computing resource is resource such as a central processor that provides a computing function and may be quantitatively represented by a computing time length. This is not limited here. The data storage resource is resource such as a memory, a disk, or a hard disk that provides a storage space and is used to store data, and may be quantitatively represented by the size of a data storage space. This is not limited here. Therefore, the data resource use event includes a data resource use event for the data computing resource and a data resource use event for the data storage resource. For example, after a computing task is constructed, the task needs to be executed. During an execution process, a computing capability of the central processor or the like is required, and the data computing resource is consumed. In this process, an access frequency of data generated by the task being lower than an xx frequency, a running duration of the task being lower than an xx duration, and the like all belong to the data resource use event, specifically, the data resource use event of the data computing resources. For example, for storage of data, an access frequency of the data stored in a data table being lower than an xx frequency, a used data storage space of a disk being less than xx GB, and the like all belong to the data resource use event, specifically, the data resource use event of the data storage resource.

Based on the foregoing content, the data resource use event for healthy use of the data resource in the data resource use standard may include a data resource use event indicating that the data resource is effectively used, and the data resource being effectively used indicates that the data resource is used healthily. For example, the data resource use event in which the data resource is effectively used may be that an access frequency of data generated by a task is high (indicating that the data generated by the task is valid and may be effectively used. Correspondingly, the consumed data computing resource is effectively consumed, and the data resource is effectively used), or an access frequency of a data table is high (indicating that the data is effectively stored, and the consumed data storage resource is valid, and the data resource is effectively used). In addition, the data resource use event for healthy use of the data resource in the resource use standard may further include a data resource use event indicating that a resource is free of risk or has a low resource risk, and a low resource risk level indicates that the data resource is also used healthily. For example, the data resource use event in which the data resource is free of risk or has a low data resource risk may be that the running duration of a task is less than 4 hours (indicating that the running duration of the task is appropriate, consumption of the data computing resource is performed normally, there is no risk, and there is no impact on the service), or a used data storage space of a disk is less than 40% (indicating that the storage resource is used normally, there is no risk, and there is no impact on the service). It can be learned that the data resource use event indicating that the data resource is effectively used in the data resource use standard is not limited here, and may be set, added, or deleted according to an actual situation.

In this embodiment of the present application, the data resource needs to be used as much as possible according to the data resource use event for healthy use of the data resource in the data resource use standard. However, in the use process of the data resource, health assessment still needs to be performed on the use of the data resource, to avoid a situation in which the use of the data resource causes a service problem as much as possible.

Based on this, as an optional example, the resource effective utilization degree is determined based on a data resource use event corresponding to the data resource and a resource effective use calibration relationship. The resource effective use calibration relationship includes correspondence between at least one data resource use event and at least one resource effective utilization degree.

The resource effective use calibration relationship lists as many data resource use events that may occur and corresponding resource effective utilization degrees as possible. That is, the data resource use event in the resource effective use calibration relationship may be an event that is effectively used or maybe an event that is inefficiently or invalidly used. The resource effective utilization degree corresponding to any data resource use event may be found through the resource effective use calibration relationship. It can be learned that the resource effective use calibration relationship is obtained through calibration in advance. A calibration method is not limited here and may be determined according to an actual situation.

For example, the data resource is data computing resource consumed for task computing, the data resource use event corresponding to the data resource is that an access frequency of data generated by the task is 50 times a week, and the resource effective utilization degree corresponding to the data resource use event is found in the resource effective use calibration relationship. Another example: The data resource is data storage resource consumed for data storage, the data resource use event corresponding to the data resource is that an access frequency of a data table is 10 times a day, and the resource effective utilization degree corresponding to the data resource use event is found in the resource effective use calibration relationship.

As an optional example, the resource risk level is determined based on the data resource use event and a resource use risk calibration relationship, and the resource use risk calibration relationship includes a correspondence between at least one data resource use event and at least one resource risk level.

The resource use risk calibration relationship lists as many data resource use events that may occur and corresponding resource risk levels as possible. That is, the data resource use event in the resource use risk calibration relationship may be an event with a high resource risk level or maybe an event with a low resource risk level. The resource risk level corresponding to any data resource use event may be found through the resource use risk calibration relationship. It can be learned that the resource use risk calibration relationship is obtained through calibration in advance. A calibration method is not limited here and may be determined according to an actual situation.

For example, the data resource is the data computing resource consumed for task computing, the data resource use event corresponding to the data resource is that a running duration of a task is more than 8 hours, and the resource effective utilization degree corresponding to the data resource use event is found in the resource effective use calibration relationship. Another example: The data resource is data storage resource consumed for disk data storage, the data resource use event corresponding to the data resource is that a used data storage space of a disk is less than 30%, and the resource effective utilization degree corresponding to the data resource use event is found in the resource effective use calibration relationship.

Based on the foregoing content, this embodiment of the present application provides an implementation of determining the resource effective utilization degree and the resource risk level based on the data resource use event, a corresponding resource effective use calibration relationship, and a resource use risk calibration relationship. The resource effective use calibration relationship and the resource use risk calibration relationship are calibrated in advance, which can more accurately reflect the current degree of effective use of the data resource and the current degree of use risk so that the obtained resource effective utilization degree and resource risk level of the data resource are also more accurate.

However, this embodiment of the present application is not limited to the foregoing implementation of obtaining the resource effective utilization degree and the resource risk level, and another method that can obtain the resource effective utilization degree and the resource risk level and that is existing or will appear in the future may alternatively be used for implementation.

It may be understood that there are usually a plurality of data resource use events. When the resource user is a department, the resource effective utilization degree and the resource risk level corresponding to each data resource use event in the department may be obtained. These are all used to assess the health of the data resource of the department.

S202: determining a weight corresponding to the resource effective utilization degree and a weight corresponding to the resource risk level.

Both the resource effective utilization degree and the resource risk level are used to assess the health of the data resource in a use process. After the resource effective utilization degree and the resource risk level are determined, the weight corresponding to the resource effective utilization degree and the weight corresponding to the resource risk level may be determined. The weight is used to indicate the impact degree of the risk assessment indicator on the health assessment result of the data resource. The larger the weight, the greater the impact of the risk assessment indicator on the health assessment result. For example, the sum of the weight corresponding to the resource effective utilization degree and the weight corresponding to the resource risk level maybe 1.

In a possible implementation, this embodiment of the present application provides a specific implementation of determining the weight corresponding to the resource effective utilization degree and the weight corresponding to the resource risk level, including:

when a total resource amount of the data resource is greater than a target resource amount, determining that a weight corresponding to the resource effective utilization degree is greater than a weight corresponding to the resource risk level; or when a ratio of a resource usage amount of the data resource to the total resource amount of the data resource is greater than a target ratio, determining that the weight corresponding to the resource effective utilization degree is less than the weight corresponding to the resource risk level.

For the first case, when the total resource amount of the data resource is greater than the target resource amount, it indicates that the data resource is very sufficient. For example, a total resource amount of data resource allocated to department A is sufficient. When the data resource is insufficient or are wasted seriously, the degree of impact of the use of the data resource on a service is high, the use risk of the data resource is high, and the service may be unable to proceed. However, when the data resource is sufficient, a focus of health assessment of the data resource may be on whether the data resource is effectively used, that is, whether the data resource is effectively used is mainly analyzed. In this case, a weight corresponding to the resource effective utilization degree may be set to be greater than a weight corresponding to the resource risk level.

For the second case, when the ratio of the resource usage amount of the data resource to the total resource amount of the data resource is greater than the target ratio, it indicates that the data resource is insufficient, and may not be sufficient for the service to use. In this case, the degree of impact on the service is high, and the use risk of the data resource is high. Therefore, a weight corresponding to the resource effective utilization degree may be set to be less than a weight corresponding to the resource risk level.

It may be understood that in the use process of the data resource, the resource effective utilization degree of the data resource may be high, and the data resource is effectively used. From a perspective of assessing the health of the data resource based on the resource effective utilization degree, the use of the data resource is healthy. However, the resource risk level of the data resource may also be high, that is, from a perspective of assessing the health of the data resource based on the resource risk level, the use of the data resource is not healthy. For example, the data storage space of a disk is 100 GB, and 80 GB of the disk is effectively used, but the data storage space of the disk remains 20 GB. The data storage space of the disk being less than or equal to 20 GB is used as a data resource use event, and a resource risk level corresponding to the data resource use event is determined through a resource use risk calibration relationship as a high-risk level, indicating that a risk of using the data resource is a high risk. In this case, it may be preferred that the weight corresponding to the resource risk level is greater than the weight corresponding to the resource effective utilization degree, so that a proportion of assessing the health of the data resource based on the resource risk level increases, and a user may pay attention to this situation.

Based on the foregoing content, it can be learned that this embodiment of the present application provides the two scenarios for determining the weight corresponding to the resource effective utilization degree and the weight corresponding to the resource risk level, so that the weights are distributed more reasonably, and a subsequent health assessment result of the resources is more accurate. It can be learned that the target resource amount and the target ratio are not limited in this embodiment of the present application, and may be determined according to an actual situation. In addition, the weight corresponding to the resource effective utilization degree and the weight corresponding to the resource risk level may also be periodically adjusted according to an actual use situation of the data resource, so that the weights are distributed more accurately.

S203: obtaining a health assessment result of the data resource based on the resource effective utilization degree, the resource risk level, the weight corresponding to the resource effective utilization degree, and the weight corresponding to the resource risk level.

For example, the health assessment result of the data resource may be represented by a health score, and the higher the health score, the healthier the use of the data resource.

In a possible implementation, this embodiment of the present application provides a specific implementation of obtaining the health assessment result of the data resource based on the resource effective utilization degree, the resource risk level, the weight corresponding to the resource effective utilization degree, and the weight corresponding to the resource risk level, including A1 to A3:

A1: determining a first score corresponding to the resource effective utilization degree based on the resource effective utilization degree and a first calibration table, the first calibration table including at least one resource effective utilization degree, at least one score, and a correspondence between the resource effective utilization degree and the score in the first calibration table.

The first calibration table is obtained through calibration in advance, and the first score corresponding to the obtained resource effective utilization degree may be determined according to the first calibration table.

A2: determining a second score corresponding to the resource risk level based on the resource risk level and a second calibration table, wherein the second calibration table includes at least one resource risk level, at least one score, and a correspondence between the resource risk level and the score in the second calibration table.

The second calibration table is obtained through calibration in advance, and the second score corresponding to the obtained resource risk level may be determined according to the second calibration table.

A3: using a score obtained by performing a weighted summation on the first score, the weight corresponding to the resource effective utilization degree, the second score, and the weight corresponding to the resource risk level as the health assessment result of the data resource.

For example, a health score of the data resource=(the first score×the weight corresponding to the resource effective utilization degree+the second score×the weight corresponding to the resource risk level).

It can be learned from A1 to A3 that in this specific implementation, the resource effective utilization degree is converted into a score, so that a health degree of the data resource in the use process can be reflected intuitively through the score.

In another possible implementation, this embodiment of the present application provides a specific implementation of obtaining the health assessment result of the data resource based on the resource effective utilization degree, the resource risk level, the weight corresponding to the resource effective utilization degree, and the weight corresponding to the resource risk level, including:

inputting the resource effective utilization degree, the resource risk level, the weight corresponding to the resource effective utilization degree, and the weight corresponding to the resource risk level into a data resource health assessment model, and obtaining the health assessment result of the data resource output by the health assessment model.

In an actual application, the data resource health assessment model may be trained in advance. An input of the data resource health assessment model is the resource effective utilization degree, the resource risk level, the weight corresponding to the resource effective utilization degree, and the weight corresponding to the resource risk level, and an output of the data resource health assessment model is the health assessment result of the data resource, which may also be represented by a health score.

For example, the data resource health assessment model is obtained by performing training based on sample data and a label value corresponding to the sample data. The sample data includes a historical resource effective utilization degree, a historical resource risk level, a weight corresponding to the historical resource effective utilization degree, and a weight corresponding to the historical resource risk level of the data resource. The label value of the sample data is an actual health assessment result of the data resource.

As an optional example, the data resource health assessment model may be a model composed of a convolutional neural network or the like. A model with a better prediction effect may be used for training and use, so that a result of the data resource health assessment is more accurate. An internal structure of the data resource health assessment model is not limited here.

It may be understood that when the resource user is a department, a resource effective utilization degree and a resource risk level corresponding to each data resource use event in the department can be obtained, and a resource assessment result of data resource used in each data resource use event can also be obtained. When a whole department is used as a data resource health assessment dimension, the health assessment result of each data resource under the department may be counted and comprehensively assessed. A comprehensive assessment manner is not limited here. For example, when the health assessment result is represented by a health score, the health scores may be accumulated.

S204: obtaining a data resource use event related to the health assessment result, and performing data resource governance based on the data resource use event.

The data resource use event is an event that causes the health assessment result in S203. Further, the data resource use event may be analyzed, and the data resource governance is performed, to improve the health assessment result. For details, see the following.

Based on the foregoing related content of S201 to S204, it can be learned that the present application provides a data resource health maintenance method. A health assessment indicator for assessing the health of the data resource is determined, and the health assessment indicator includes a resource effective utilization degree and a resource risk level of the data resource in a use process. The resource effective utilization degree is used to indicate the degree to which the data resource is effectively used, and the resource risk level is used to indicate the degree of negative impact of the use of the data resource on a service. The lower the resource effective utilization degree, the smaller the degree to which the data resource is effectively used, and the lower the health degree of the use of the data resource. The higher the resource risk level, the greater the degree of negative impact of the use of the data resource on the service, and the lower the health degree of the use of the data resource. In addition, the resource effective utilization degree affects a change in the resource risk level. It can be learned that the lower the resource effective utilization degree, the more data resource that is used invalidly or inefficiently, and the more likely it is to affect the service, so that the resource risk level increases faster. Further, a weight corresponding to the resource effective utilization degree and a weight corresponding to the resource risk level are determined. The weights are used to indicate an impact proportion on the health assessment result of the data resource. Based on this, the health assessment result of the data resource is obtained based on the resource effective utilization degree, the resource risk level, the weight corresponding to the resource effective utilization degree, and the weight corresponding to the resource risk level. Further, a data resource use event related to the health assessment result is obtained, and data resource governance is performed based on the data resource use event. In this way, in the maintenance method provided in the present application, the resource effective utilization degree and the resource risk level in the data resource use process are used as the health assessment indicators of the data resource, and the health of the data resource in the use process is assessed based on the degree of effective use of the data resource and the degree of negative impact of the use of the data resource on the service. It can be learned that the provided health assessment indicators are not single and can accurately reflect the health of the data resource, so the assessment accuracy of the health of the data resource is high, and the method can be automatically performed to a certain extent, which can reduce manual costs. In addition, the data resource is managed to improve the health assessment result.

As shown in FIG. 3 again, as an optional example, the health assessment indicator further includes a use value degree of the data resource, and the use value degree may be represented by a value within 100. This is not limited here. The use value degree of the data resource is used to indicate a relationship between a resource output and a resource input of the data resource. When the use value degree of the data resource is high, it indicates that the quality of the resource output is high, and it is determined that the health degree of the data resource is high. It can be learned that the use value degree of the data resource is used as another health assessment indicator, which enriches a dimension of the data resource health assessment and can make the process of the data resource health assessment closer to reality and make an assessment result more accurate.

In a possible implementation, this embodiment of the present application provides a specific implementation of obtaining the health assessment result of the data resource based on the resource effective utilization degree, the resource risk level, the weight corresponding to the resource effective utilization degree, and the weight corresponding to the resource risk level in S203, including B1 and B2:

B1: obtaining a weight corresponding to the use value degree.

B2: obtaining the health assessment result of the data resource based on the resource effective utilization degree, the resource risk level, the use value degree, the weight corresponding to the resource effective utilization degree, the weight corresponding to the resource risk level, and the weight corresponding to the use value degree.

It may be understood that after the use value degree is added as the health assessment indicator, the health assessment result of the data resource may also be obtained in the manner in A1 to A3. Only a third calibration table needs to be added. The third calibration table is used to determine a third score corresponding to the use value degree. The third calibration table includes at least one use value degree, at least one score, and a correspondence between the use value degree and the score. Finally, a score is obtained by performing weighted summation on the first score, the weight corresponding to the resource effective utilization degree, the second score, the weight corresponding to the resource risk level, the third score, and the weight corresponding to the use value degree is used as the health assessment result of the data resource. In addition, after the use value degree is added as the health assessment indicator, the health assessment result of the data resource may also be obtained by using the health assessment model. Only the use value degree and the weight corresponding to the use value degree need to be added as inputs for training when the health assessment model is trained.

In an actual application, the data resource is used to construct a data warehouse model in a data warehouse, and the data warehouse model is used to store data. Data storage needs to consume resources, for example, storage resources.

In a possible implementation, this embodiment of the present application provides a specific implementation of obtaining the use value degree of the data resource, including C1 to C3:

C1: determining a quotient of the number of first data warehouse models and the total number of data warehouse models as an asset concentration of the data resource, the asset concentration being used to indicate the resource output of the data resource.

The data warehouse model may be understood as a data table. In a data warehouse, the data table may be referred to as a data warehouse model. For example, a data warehouse model that satisfies one or more of the following conditions is a first (high-value) data warehouse model:

the number of downstream users of the data warehouse model exceeds a target number, an indicator obtained by the data warehouse model is a target indicator, and data of the data warehouse model is visually displayed.

It may be understood that if the number of downstream users of a data warehouse model (that is, a data table) is large after the data warehouse model is constructed, it is determined that the use value of the data warehouse model is high. In addition, the data warehouse model (that is, the data table) is used to implement some services and is associated with the services. When an indicator obtained by using the data warehouse model is a target indicator, it is determined that the use value of the data warehouse model is high. The indicator is an indicator involved in a service, and the target indicator is a core indicator in the service. In addition, when related data in the data warehouse model (that is, the data table) is displayed visually, it also indicates that the use value of the data warehouse model is high.

The total number of data warehouse models is the total number of data tables in the data warehouse. The number of first data warehouse models in the data warehouse is counted, and a quotient of the number of first data warehouse models and the total number of data warehouse models is determined as an asset concentration of the data resource. The data warehouse model may be used to represent the resource output of the data resource. That is, the data warehouse model is generated by consuming the data resource. In this step, the asset concentration may also be used to represent the resource output of the data resource. The higher the asset concentration, the higher the value of the resource output of the data resource.

C2: determining a quotient of the total data storage amount of the data warehouse and a data storage amount of an operational data store layer in the data warehouse as a cost input coefficient of the data resource, the operational data store layer being used to store source data of a service system, and the cost input coefficient being used to indicate the resource input of the data resource.

The data warehouse generally includes five layers: an operational data store (ODS) layer, a data middle (DWM) layer, a data detail (DWD) layer, a data service (DWS) layer, and a dimension table (DIM) layer. The ODS layer needs to be connected to a plurality of different types of service system libraries. The ODS layer may be considered as a simple backup of a service system data source, that is, the ODS layer stores source data of the service system. Data stored in the remaining three layers of the data warehouse is data (for example, data in a DWD table) obtained after data processing is performed on the source data of the service system. The data processing may be referred to as upper-layer construction of data.

The total data storage amount of the data warehouse is the total data storage amount occupied by data stored in the four layers. A quotient of the total data storage amount of the data warehouse and the data storage amount of an operational data store layer in the data warehouse is determined as a cost input coefficient of the data resource. It can be learned that the cost input coefficient is a coefficient greater than 1, and the cost input coefficient is used to indicate a resource input of the data resource. The larger the cost input coefficient, the richer the upper-layer construction, and the greater the resource input of the data resource.

C3: determining a quotient of the asset concentration and the cost input coefficient as the use value degree of the data resource.

A quotient of the asset concentration and the cost input coefficient is calculated and is used as the use value degree of the data resource. The use value degree of the data resource is a ratio of the resource output to the resource input. When the asset concentration is large and the cost input coefficient is small, it indicates that the data resource is input less, but the value degrees of generated data warehouse models are high, and it is determined that the use value degree of the data resource is high.

Based on the foregoing related content of C1 to C3, it can be learned that this embodiment of the present application provides a specific implementation of determining the use value degree of the data resource. A value degree of use of the data resource is determined based on a proportion of the first resource output in the resource input. This manner can accurately indicate whether the data resource is efficiently used, which is consistent with an actual situation, and the accuracy of the obtained use value degree of the data resource is high.

In addition, this embodiment of the present application is not limited to the implementation of determining the use value degree of the data resource in C1 to C3, and any method that can determine the use value degree of the data resource, whether existing or to appear in the future, may alternatively be used for implementation.

Figure 4:
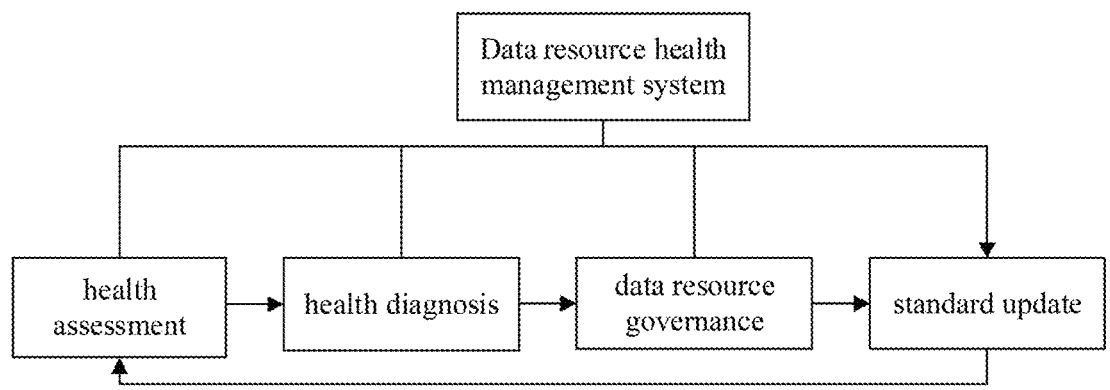
FIG. 4 is a schematic diagram of a data resource health management system according to an embodiment of the present application.

Based on the foregoing content, it can be learned how to accurately assess the health of the data resource, to promptly prompt a resource user to pay attention. Referring to FIG. 4, where FIG. 4 is a schematic diagram of a data resource health management system according to an embodiment of the present application. As shown in FIG. 4, this embodiment of the present application provides a data resource health management system. In this system, not only health assessment of the data resource is included, but also health diagnosis of the data resource, data resource governance, standard update, and the like are included, so that the data resource health management system is more complete to form a complete mechanism. The following describes the health diagnosis of the data resource, health governance of the data resource, standard update, and the like. For details, see the following.

In a possible implementation, this embodiment of the present application provides a specific implementation of obtaining a data resource use event related to the health assessment result in S204, including the following steps:

determine a first data resource use event in which a resource effective utilization degree is less than a target effective utilization degree and a second data resource use event in which a resource risk level is higher than a target risk level.

Based on this, the data resource health assessment method provided in this embodiment of the present application further includes the following steps:

analyzing the first data resource use event and the second data resource use event, and updating a data resource use standard based on an analysis result, the data resource use standard including data resource use events for healthy use of the data resource.

When the resource effective utilization degree is less than the target effective utilization degree, it is determined that the resource effective utilization degree is low, which affects the health of the data resource, and data resource governance needs to be performed. When the resource risk level is higher than the target risk level, it is determined that there is a risk in the use of the data resource, which affects the health of the data resource, and data resource governance needs to be performed. The target effective utilization degree and the target risk level are not limited here and may be determined according to an actual situation.

In this case, the first data resource use event in which the resource effective utilization degree is less than the target effective utilization degree and the second data resource use event in which the resource risk level is higher than the target risk level are determined. The first data resource use event is a cause of a decrease in the effective use degree of the data resource, and the second data resource use event is a cause of risk in the data resource. In this way, health diagnosis is implemented, and the health diagnosis is used to learn the cause of a low health degree of the data resource. Both the first data resource use event and the second data resource use event belong to the data resource use event related to the health assessment result in S204.

After the first data resource use event and the second data resource use event are learned, the first data resource use event and the second data resource use event are analyzed, to determine a cause of the low health degree of the data resource, and the data resource use standard is updated based on an analysis result. For example, the second data resource use event is that the life cycle of a data table is 5 days. The life cycle is short, which easily causes data in the data table to be quickly released, affecting a service. A data storage resource used by the data table has a use risk, resulting in a decrease in the health degree of the data resource. Through analysis, it is determined that the life cycle of the data table needs to be greater than or equal to 20 days. In this way, the use risk of the data storage resource can be reduced, and the health degree of the use of the data resource is improved. In this way, the data resource use event "a life cycle of a data table is greater than or equal to 20 days" may be used as the data resource use event for healthy use of the data resource, and is added to the data resource use standard, to update the data resource use standard.

Based on the foregoing content, after the health diagnosis is performed, the data resource use standard may be updated through analysis and summarization of a diagnosis result, to form a mechanism. As shown in FIG. 4, the data resource use standard may be used to indicate subsequent use of the data resource. When the health assessment and the health diagnosis are performed, the same problem may be avoided from occurring continuously as much as possible, to form a closed loop of data resource management.

In the data resource health management system in FIG. 4, the health diagnosis is followed by data resource governance, which is used to improve the health degree of the data resource through the data resource governance.

In a possible implementation, this embodiment of the present application provides a specific implementation of performing data resource governance based on the data resource use event in S204, including the following steps:
when the first data resource use event is a data storage resource use event, performing the data resource governance according to a data storage resource governance manner in a data storage resource governance calibration relationship, to improve the resource utilization degree; and
when the first data resource use event is a data computing resource use event, performing the data resource governance according to a data computing resource governance manner in a data computing resource governance calibration relationship, to improve the resource utilization degree;
where the data storage resource governance calibration relationship includes a correspondence between at least one data storage resource use event and at least one data storage resource governance manner, and the data computing resource governance calibration relationship includes a correspondence between at least one data computing resource use event and at least one data computing resource governance manner.

The data storage resource governance calibration relationship and the data computing resource governance calibration relationship are obtained in advance through a calibration manner. A specific calibration manner is not limited here and may be set according to an actual situation.

It may be understood that when the first data resource use event is different, a different corresponding data resource governance manner is provided, which may be found and determined based on the data resource governance calibration relationship. When the first data resource use event is the data storage resource use event and the first data resource use event is related to the use of the data storage resource, the corresponding data storage resource governance manner is found based on the data storage resource governance calibration relationship, to perform governance on the data storage resource based on the found data storage resource governance manner. When the first data resource use event is the data computing resource use event, a processing manner is similar, and details are not described herein again. In this way, the first data resource use event is divided into two directions: storage and computing. Correspondingly, the data resource governance is also divided into the two directions: storage and computing. A corresponding detailed governance manner is provided based on a detailed data resource use event, and the process may be solidified into a data resource management process or a related data resource management product. An automatic governance manner is used to automatically implement a governance process, to complete the data resource governance.

In a possible implementation, the data resource health maintenance method provided in this embodiment of the present application further includes the following steps:
when the first data resource use event is a target data storage resource use event, performing release assessment on target data resource used corresponding to the first data resource use event or some (part of) data resource in the target data resource, to obtain a release assessment result, where the target data storage resource use event is an event with the resource effective utilization degree lower than the target effective utilization degree because an access frequency of data using the data resource is lower than a target frequency; and
when the release assessment result is a positive result, releasing the target data resource or the part of the data resource in the target data resource.

It can be learned that when the target data storage resource use event is an event in which a resource effective utilization degree is less than a target effective utilization degree because an access frequency of data using the resources is less than a target frequency, the target data resource corresponding to the target data storage resource use event or the part of the data resource in the target data resource may be released. Release assessment is performed before the release, to obtain a release assessment result, and whether the target data resource or the part of the data resource in the target data resource can be released is determined based on the release assessment result. When the release assessment result is a positive result (for example, "Yes"), it indicates that the data resource can be released, and the target data resource or the part of the data resource in the target data resource is released. A release assessment manner may be determined based on a specific target data storage resource use event. This is not limited here. Alternatively, a correspondence between the target data storage resource use event and the release assessment manner may be calibrated in advance, to determine the release assessment manner based on a calibration relationship.

For example, if 300 data tables have not been accessed in recent 30 days, it is determined, after the release assessment, that no service uses the 300 data tables in the next month, and the 300 data tables are deleted (indicating that the release assessment result is "Yes"), to release the data storage resources. In addition, a specific release manner may be implemented through customization. For example, the 300 data tables are selected, and one-click deletion is implemented to release the data storage resource.

Another example: Partition data is accessed at a low frequency. It is determined, after release assessment, that a use frequency of the partition data is low in the next month (indicating that the release assessment result is "Yes"). In this case, retention processing may be performed on the data, that is, the number of backup copies of the partition data is reduced, and the data storage resource is released.

It can be learned that the governance manner corresponding to the target data storage resource use event is to release the data storage resource and/or the data computing resource, to reduce invalid or inefficient use of the data resource and improve the health degree of the data resource. After the data resource are released, computing efficiency and storage efficiency of hardware resource can also be improved.

In addition, the second data resource use event may also be divided into the data storage resource use event and the data computing resource use event, and a corresponding calibration relationship is set, to find a corresponding governance manner through the calibration relationship, and perform the data resource governance through a specific governance manner, to reduce the resource risk level and improve the health degree of the data resource.

Based on the foregoing content, it can be learned that in this embodiment of the present application, when the health degree of the data resource is low, a specific governance manner can be provided to a user, so that the health assessment of the data resource can be responded in time, to avoid a service accident.

Persons skilled in the art may understand that in the foregoing method of the specific implementation, an order of writing of the steps does not mean a strict execution order, and does not constitute any limitation on an implementation process. A specific execution order of the steps should be determined by functions and a possible internal logic thereof.

Based on the data resource health maintenance method provided in the foregoing method embodiment, this embodiment of the present application further provides a data resource health maintenance apparatus. The data resource health maintenance apparatus will be described below with reference to the accompanying drawings. Because a principle of solving problems in the apparatus in the embodiments of the present disclosure is similar to that of the data resource health maintenance method in the foregoing embodiments of the present application, implementation of the apparatus may refer to implementation of the method, and details are not described again for the parts that are the same.

Figure 5:
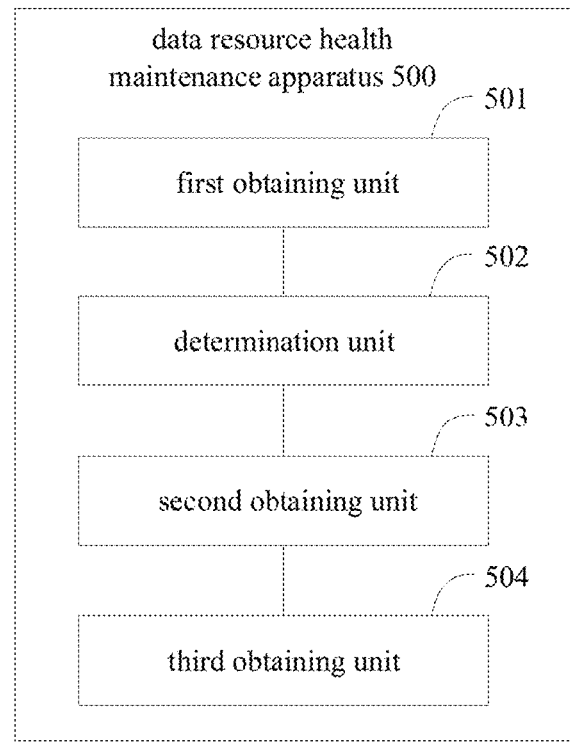
FIG. 5 is a schematic diagram of a structure of a data resource health maintenance apparatus according to an embodiment of the present application.

FIG. 5 is a schematic diagram of a structure of a data resource health maintenance apparatus according to an embodiment of the present application. The data resource includes data computing resource and data storage resource. As shown in FIG. 5, the data resource health maintenance apparatus 500 includes:
- a first obtaining unit 501, configured to obtain a health assessment indicator for assessing health of the data resource, wherein the health assessment indicator includes a resource effective utilization degree and a resource risk level of the data resource in a use process, the resource effective utilization degree is used to indicate a degree to which the data resource is effectively used, the resource risk level is used to indicate a degree of negative impact of use of the data resource on a service, and the resource effective utilization degree is negatively correlated with a rising rate of the resource risk level;
- a determination unit 502, configured to determine a weight corresponding to the resource effective utilization degree and a weight corresponding to the resource risk level;
- a second obtaining unit 503, configured to obtain a health assessment result of the data resource based on the resource effective utilization degree, the resource risk level, the weight corresponding to the resource effective utilization degree, and the weight corresponding to the resource risk level; and
- a third obtaining unit, configured to obtain a data resource use event related to the health assessment result, and performing data resource governance based on the data resource use event.

In a possible implementation, the health assessment indicator further includes a use value degree of the data resource, and the use value degree of the data resource is used to indicate a relationship between a resource output and a resource input of the data resource;
the second obtaining unit 503 is specifically configured to:
obtain a weight corresponding to the use value degree; and obtain the health assessment result of the data resource based on the resource effective utilization degree, the resource risk level, the use value degree, the weight corresponding to the resource effective utilization degree, the weight corresponding to the resource risk level, and the weight corresponding to the use value degree.

In a possible implementation, the data resource is used to construct a data warehouse model in a data warehouse, the data warehouse model is used to store data, and a process of obtaining the use value degree of the data resource includes: determining a quotient of a number of first data warehouse models and a total number of data warehouse models as an asset concentration of the data resource, wherein the asset concentration is used to indicate the resource output of the data resource; determining a quotient of a total data storage amount of the data warehouse and a data storage amount of an operational data store layer in the data warehouse as a cost input coefficient of the data resource, wherein the operational data store layer is used to store source data of a service system, and the cost input coefficient is used to indicate the resource input of the data resource; and determining a quotient of the asset concentration and the cost input coefficient as the use value degree of the data resource:
a data warehouse model that satisfies one or more of following conditions is the first data warehouse model:
a number of downstream users of the data warehouse model exceeds a target number, an indicator obtained by the data warehouse model is a target indicator, and data of the data warehouse model is visually displayed.

In a possible implementation, the determination unit 502 includes:
a first determination subunit, configured to, when a total resource amount of the data resource is greater than a target resource amount, determine that the weight corresponding to the resource effective utilization degree is greater than the weight corresponding to the resource risk level; or
a second determination subunit, configured to, when a ratio of a resource usage amount of the data resource to the total resource amount of the data resource is greater than a target ratio, determine that the weight corresponding to the resource effective utilization degree is less than the weight corresponding to the resource risk level.

In a possible implementation, the second obtaining unit 503 includes:
a third determination subunit, configured to determine a first score corresponding to the resource effective utilization degree based on the resource effective utilization degree and a first calibration table, wherein the first calibration table includes at least one resource effective utilization degree, at least one score, and a correspondence between the at least one resource effective utilization degree and the at least one score in the first calibration table;

a fourth determination subunit, configured to determine a second score corresponding to the resource risk level based on the resource risk level and a second calibration table, wherein the second calibration table includes at least one resource risk level, at least one score, and a correspondence between the at least one resource risk level and the at least one score in the second calibration table; and a fifth determination subunit, configured to use a score obtained by performing a weighted summation on the first score, the weight corresponding to the resource effective utilization degree, the second score, and the weight corresponding to the resource risk level as the health assessment result of the data resource.

In a possible implementation, the second obtaining unit 503 includes:

an obtaining subunit, configured to input the resource effective utilization degree, the resource risk level, the weight corresponding to the resource effective utilization degree, and the weight corresponding to the resource risk level into a data resource health assessment model, and obtaining the health assessment result of the data resource output by the health assessment model;

wherein the data resource health assessment model is obtained by performing training based on sample data and a label value corresponding to the sample data, the sample data includes a historical resource effective utilization degree, a historical resource risk level, a weight corresponding to the historical resource effective utilization degree, and a weight corresponding to the historical resource risk level, and the label value of the sample data is an actual health assessment result.

In a possible implementation, the resource effective utilization degree is determined based on a data resource use event corresponding to the data resource and a resource effective use calibration relationship, and the resource risk level is determined based on the data resource use event and a resource use risk calibration relationship, the resource effective use calibration relationship includes a correspondence between at least one data resource use event and at least one resource effective utilization degree, and the resource use risk calibration relationship includes a correspondence between at least one data resource use event and at least one resource risk level;

the third obtaining unit includes:

a sixth determination subunit, configured to determine a first data resource use event with a resource effective utilization degree lower than a target effective utilization degree and a second data resource use event with a resource risk level higher than a target risk level; and the apparatus further includes:

an updating unit, configured to analyze the first data resource use event and the second data resource use event, and updating a data resource use standard based on an analysis result, wherein the data resource use standard includes data resource use events for healthy use of the data resource.

In a possible implementation, the third obtaining unit includes:

a first governance subunit, configured to, when the first data resource use event is a data storage resource use event, perform the data resource governance according to a data storage resource governance manner in a data storage resource governance calibration relationship, to improve the resource utilization degree; and a second governance subunit, configured to, when the first data resource use event is a data computing resource use event, perform the data resource governance according to a data computing resource governance manner in a data computing resource governance calibration relationship, to improve the resource utilization degree;

wherein the data storage resource governance calibration relationship includes a correspondence between at least one data storage resource use event and at least one data storage resource governance manner, and the data computing resource governance calibration relationship includes a correspondence between at least one data computing resource use event and at least one data computing resource governance manner.

In a possible implementation, the apparatus further includes:

an assessment unit, configured to, when the first data resource use event is a target data storage resource use event, performing release assessment on target data resource used corresponding to the first data resource use event or part of the data resource in the target data resource, to obtain a release assessment result, wherein the target data storage resource use event is an event with the resource effective utilization degree lower than the target effective utilization degree because an access frequency of data using the data resource is lower than a target frequency; and a release unit, configured to, when the release assessment result is a positive result, releasing the target data resource or the part of the data resource in the target data resource.

Based on the implementations provided in the foregoing aspects, the present application may further perform further combination to provide more implementations.

It should be noted that for specific implementations of the units in this embodiment, reference may be made to related descriptions in the foregoing method embodiments. The division of the units in this embodiment of the present application is schematic and is merely a logical function division. Another division manner may be used during actual implementation. Each functional unit in this embodiment of the present application may be integrated into one processing unit, may exist alone physically, or may be integrated into one unit by two or more units. For example, in the foregoing embodiments, the processing unit and the sending unit may be the same unit, or may be different units. The foregoing integrated unit may be implemented in a form of hardware, or may be implemented in a form of a software functional unit.

Based on the data resource health maintenance method provided in the foregoing method embodiment, the present application further provides an electronic device, including: one or more processors; and a storage apparatus having one or more programs stored thereon, where when the one or more programs are executed by the one or more processors, the one or more processors are caused to implement the data resource health maintenance method according to any of the foregoing embodiments.

Figure 6:
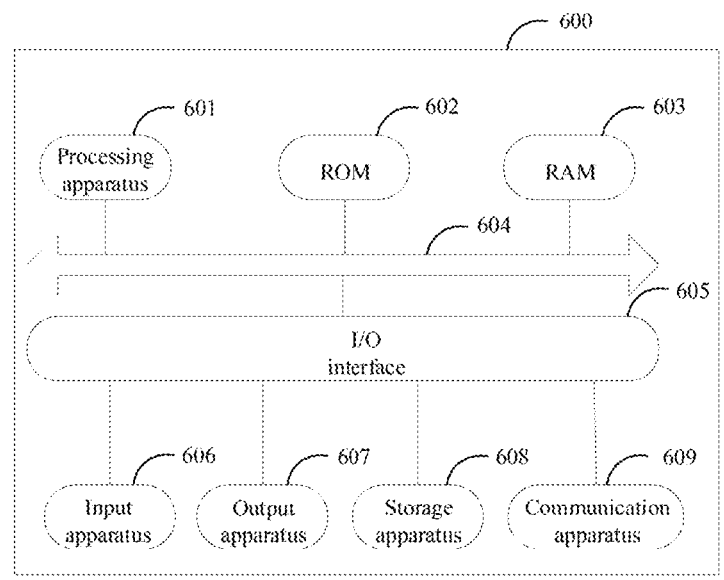
FIG. 6 is a schematic diagram of a basic structure of an electronic device according to an embodiment of the present application.

Reference is made to FIG. 6 below, which is a schematic diagram of a structure of an electronic device 600 suitable for implementing an embodiment of the present application. The terminal device in this embodiment of the present application may include, but is not limited to, mobile terminals such as a mobile phone, a notebook computer, a digital broadcast receiver, a personal digital assistant (PDA), a portable android device (PAD), a portable media player (PMP), and a vehicle-mounted terminal (for example, a vehicle navigation terminal), and fixed terminals such as a digital TV (television), a desktop computer, and the like. The electronic device 600 shown in FIG. 6 is merely an example, and shall not impose any limitation on a function and a scope of use of the embodiments of the present application.

As shown in FIG. 6, the electronic device 600 may include a processing apparatus (for example, a central processor, a graphics processor, and the like) 601 that may perform a variety of appropriate actions and processing in accordance with a program stored in a read-only memory (ROM) 602 or a program loaded from a storage apparatus 608 into a random access memory (RAM) 603. The RAM 603 further stores various programs and data required for operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touchscreen, a touchpad, a keyboard, a mouse, a camera, a microphone, an accelerometer, and a gyroscope; an output apparatus 607 including, for example, a liquid crystal display (LCD), a speaker, and a vibrator; the storage apparatus 608 including, for example, a tape and a hard disk; and a communication apparatus 609. The communication apparatus 609 may allow the electronic device 600 to perform wireless or wired communication with other devices to exchange data. Although FIG. 6 shows the electronic device 600 having various apparatuses, it should be understood that it is not required to implement or have all of the shown apparatuses. It may be an alternative to implement or have more or fewer apparatuses.

In particular, according to an embodiment of the present application, the process described above with reference to the flowcharts may be implemented as a computer software program. For example, this embodiment of the present application includes a computer program product, which includes a computer program carried on a non-transitory computer-readable medium, where the computer program includes program code for performing the method shown in the flowchart. In such an embodiment, the computer program may be downloaded from a network through the communication apparatus 609 and installed, installed from the storage apparatus 608, or installed from the ROM 602. When the computer program is executed by the processing apparatus 601, the above-mentioned functions defined in the method of the embodiment of the present application are performed.

The electronic device provided in this embodiment of the present application and the data resource health maintenance method provided in the foregoing embodiment belong to the same inventive concept. For technical details that are not described in detail in this embodiment, reference may be made to the foregoing embodiment. In addition, this embodiment and the foregoing embodiment have the same beneficial effects.

Figure 7:
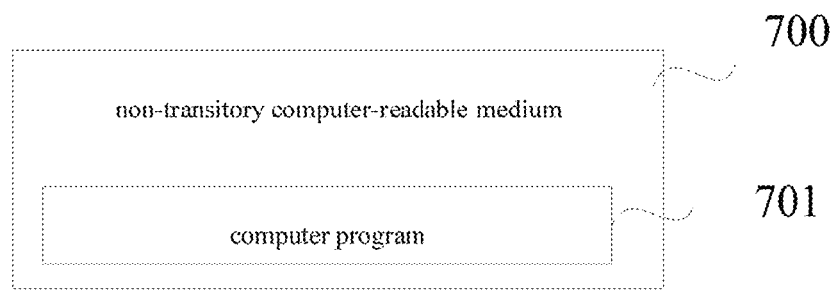
FIG. 7 is a schematic diagram of a structure of a non-transitory computer-readable medium according to an embodiment of the present application.

FIG. 7 is a schematic diagram of a structure of a non-transitory computer-readable medium according to an embodiment of the present application. Based on the data resource health maintenance method provided in the foregoing method embodiment, referring to FIG. 7, this embodiment of the present application provides a computer-readable medium 700 having a computer program 701 stored thereon, where the computer program 701, when executed by a processor, implements the data resource health maintenance method according to any of the foregoing embodiments.

It should be noted that the computer-readable medium described above in the present application may be a computer-readable signal medium, or a computer-readable storage medium, or any combination thereof. The computer-readable storage medium may be, for example but not limited to, electric, magnetic, optical, electromagnetic, infra-red, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof. In the present application, the computer-readable storage medium may be any tangible medium containing or storing a program which may be used by or in combination with an instruction execution system, apparatus, or device. In the present application, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), and the like, or any suitable combination thereof.

In some implementations, the client and the server may communicate using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The foregoing computer-readable medium may be contained in the foregoing electronic device. Alternatively, the computer-readable medium may exist independently, without being assembled into the electronic device.

The foregoing computer-readable medium carries one or more programs that, when executed by the electronic device, cause the electronic device to perform the data resource health maintenance method described above.

The computer program code for performing operations in the present application may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present application. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present application may be implemented by means of software, or may be implemented by means of hardware. The name of a unit/module does not constitute a limitation on the unit in some cases, for example, a speech data acquisition module may also be described as a "data acquisition module".

The functions described herein above may be performed, at least in part, by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present application, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include but is not limited to electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

It should be noted that the embodiments in the present specification are described in a progressive manner, and each embodiment focuses on a difference from the other embodiments. The same or similar parts between the embodiments may be referred to each other. For a system or apparatus disclosed in an embodiment, since it is corresponding to the method disclosed in the embodiment, the description is relatively simple, and for related parts, refer to the description of the method section.

It should be understood that in the present application, "at least one (item)" means one or more, and "a plurality of" means two or more. "And/or" describes an association relationship between associated objects, and represents that three relationships may exist. For example, "A and/or B" may represent: only A exists, only B exists, and both A and B exist, where A and B may be singular or plural. The character "/" generally indicates an "or" relationship between the associated objects. "At least one of the following" or a similar expression thereof means any combination of these items, including a single item (piece) or any combination of a plurality of items (pieces). For example, at least one of a, b, or c may represent: a, b, c, "a and b", "a and c", "b and c", or "a, b, and c", where a, b, and c may be singular or plural.

It should also be noted that in this document, relationship terms such as first and second are only used to distinguish one entity or operation from another entity or operation, and do not necessarily require or imply any actual relationship or order between these entities or operations. Moreover, the terms "include", "include", or any other variant thereof are intended to cover a non-exclusive inclusion, so that a process, method, article, or device that includes a list of elements includes not only those elements, but also other elements not explicitly listed, or further includes elements inherent to such process, method, article, or device. Without further limitation, an element defined by the statement "include a/an . . . " does not exclude the existence of another identical element in the process, method, article, or device that includes the element.

The steps of the method or algorithm described in conjunction with the embodiments disclosed herein may be directly implemented by hardware, a software module executed by a processor, or a combination thereof. The software module may be placed in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing descriptions of the disclosed embodiments enable those skilled in the art to implement or use the present application. Various modifications to these embodiments will be apparent to those skilled in the art, and the general principles defined herein may be implemented in other embodiments without departing from the spirit or scope of the present application. Therefore, the present application is not limited to the embodiments shown herein, but is to comply with the widest scope consistent with the principles and novel features disclosed herein.

The invention claimed is:

1. A data resource health maintenance method, wherein the data resource comprises data computing resource and data storage resource, and the method comprises:
obtaining a health assessment indicator for assessing health of the data resource, wherein the health assessment indicator comprises a resource effective utilization degree and a resource risk level of the data resource in a use process, the resource effective utilization degree is used to indicate a degree to which the data resource is effectively used, the resource risk level is used to indicate a degree of negative impact of use of the data resource on a service, and the resource effective utilization degree is negatively correlated with a rising rate of the resource risk level;

determining a weight corresponding to the resource effective utilization degree and a weight corresponding to the resource risk level;

obtaining a health assessment result of the data resource based on the resource effective utilization degree, the resource risk level, the weight corresponding to the resource effective utilization degree, and the weight corresponding to the resource risk level; and obtaining a data resource use event related to the health assessment result, and performing data resource governance based on the data resource use event;

wherein the obtaining a health assessment result of the data resource based on the resource effective utilization degree, the resource risk level, the weight corresponding to the resource effective utilization degree, and the weight corresponding to the resource risk level, comprises:

determining a first score corresponding to the resource effective utilization degree based on the resource effective utilization degree and a first calibration table, wherein the first calibration table comprises at least one resource effective utilization degree, at least one score, and a correspondence between the at least one resource effective utilization degree and the at least one score in the first calibration table;

determining a second score corresponding to the resource risk level based on the resource risk level and a second calibration table, wherein the second calibration table comprises at least one resource risk level, at least one score, and a correspondence between the at least one resource risk level and the at least one score in the second calibration table; and using a score obtained by performing a weighted summation on the first score, the weight corresponding to the resource effective utilization degree, the second score, and the weight corresponding to the resource risk level as the health assessment result of the data resource.

2. The method according to claim 1, wherein the health assessment indicator further comprises a use value degree of the data resource, and the use value degree of the data resource is used to indicate a relationship between a resource output and a resource input of the data resource; and the obtaining a health assessment result of the data resource based on the resource effective utilization degree, the resource risk level, the weight corresponding to the resource effective utilization degree, and the weight corresponding to the resource risk level, comprises:

obtaining a weight corresponding to the use value degree; and obtaining the health assessment result of the data resource based on the resource effective utilization degree, the resource risk level, the use value degree, the weight corresponding to the resource effective utilization degree, the weight corresponding to the resource risk level, and the weight corresponding to the use value degree.

3. The method according to claim 2, wherein the data resource is used to construct a data warehouse model in a data warehouse, the data warehouse model is used to store data, and obtaining the use value degree of the data resource, comprises:

determining a quotient of a number of first data warehouse models and a total number of data warehouse models as an asset concentration of the data resource, wherein the asset concentration is used to indicate the resource output of the data resource;

determining a quotient of a total data storage amount of the data warehouse and a data storage amount of an operational data store layer in the data warehouse as a cost input coefficient of the data resource, wherein the operational data store layer is used to store source data of a service system, and the cost input coefficient is used to indicate the resource input of the data resource; and determining a quotient of the asset concentration and the cost input coefficient as the use value degree of the data resource, wherein one or more of following conditions are satisfied for the first data warehouse models:

a number of downstream users of the first data warehouse model exceeds a target number, an indicator obtained by the first data warehouse model is a target indicator, and data of the first data warehouse model is visually displayed.

4. The method according to claim 1, wherein the determining a weight corresponding to the resource effective utilization degree and a weight corresponding to the resource risk level, comprises:

when a total resource amount of the data resource is greater than a target resource amount, determining that the weight corresponding to the resource effective utilization degree is greater than the weight corresponding to the resource risk level; or when a ratio of a resource usage amount of the data resource to the total resource amount of the data resource is greater than a target ratio, determining that the weight corresponding to the resource effective utilization degree is less than the weight corresponding to the resource risk level.

5. The method according to claim 1, wherein the obtaining a health assessment result of the data resource based on the resource effective utilization degree, the resource risk level, the weight corresponding to the resource effective utilization degree, and the weight corresponding to the resource risk level, comprises:

inputting the resource effective utilization degree, the resource risk level, the weight corresponding to the resource effective utilization degree, and the weight corresponding to the resource risk level into a data resource health assessment model, and obtaining the health assessment result of the data resource output by the health assessment model;

wherein the data resource health assessment model is obtained by performing training based on sample data and a label value corresponding to the sample data, the sample data comprises a historical resource effective utilization degree, a historical resource risk level, a weight corresponding to the historical resource effective utilization degree, and a weight corresponding to the historical resource risk level, and the label value of the sample data is an actual health assessment result.

6. The method according to claim 1, wherein the resource effective utilization degree is determined based on a data resource use event corresponding to the data resource and a resource effective use calibration relationship, and the resource risk level is determined based on the data resource use event and a resource use risk calibration relationship, the resource effective use calibration relationship comprises a correspondence between at least one data resource use event and at least one resource effective utilization degree, and the resource use risk calibration relationship comprises a correspondence between at least one data resource use event and at least one resource risk level;

the obtaining a data resource use event related to the health assessment result, comprises:

determining a first data resource use event with a resource effective utilization degree lower than a target effective utilization degree and a second data resource use event with a resource risk level higher than a target risk level; and the method further comprises:

analyzing the first data resource use event and the second data resource use event, and updating a data resource use standard based on an analysis result, wherein the data resource use standard comprises data resource use events for healthy use of the data resource.

7. The method according to claim 6, wherein the performing data resource governance based on the data resource use event, comprises:

when the first data resource use event is a data storage resource use event, performing data resource governance based on a data storage resource governance manner in a data storage resource governance calibration relationship; or when the first data resource use event is a data computing resource use event, performing data resource governance based on a data computing resource governance manner in a data computing resource governance calibration relationship, wherein the data storage resource governance calibration relationship comprises a correspondence between at least one data storage resource use event and at least one data storage resource governance manner, and the data computing resource governance calibration relationship comprises a correspondence between at least one data computing resource use event and at least one data computing resource governance manner.

8. The method according to claim 6, further comprising:

when the first data resource use event is a target data storage resource use event, performing release assessment on target data resource used corresponding to the first data resource use event or part of the data resource in the target data resource, to obtain a release assessment result, wherein the target data storage resource use event is an event with the resource effective utilization degree lower than the target effective utilization degree because an access frequency of data using the data resource is lower than a target frequency; and when the release assessment result is a positive result, releasing the target data resource or the part of the data resource in the target data resource.

9. An electronic device, comprising:

one or more processors; and a storage apparatus having one or more programs stored thereon, wherein the one or more programs, when executed by the one or more processors, cause the one or more processors to implement a data resource health maintenance method, wherein the data resource health maintenance method comprises:

obtaining a health assessment indicator for assessing health of the data resource, wherein the health assessment indicator comprises a resource effective utilization degree and a resource risk level of the data resource in a use process, the resource effective utilization degree is used to indicate a degree to which the data resource is effectively used, the resource risk level is used to indicate a degree of negative impact of use of the data resource on a service, and the resource effective utilization degree is negatively correlated with a rising rate of the resource risk level;

determining a weight corresponding to the resource effective utilization degree and a weight corresponding to the resource risk level;

obtaining a health assessment result of the data resource based on the resource effective utilization degree, the resource risk level, the weight corresponding to the resource effective utilization degree, and the weight corresponding to the resource risk level; and obtaining a data resource use event related to the health assessment result, and performing data resource governance based on the data resource use event;

wherein the one or more processors further cause the electronic device to:

determine a first score corresponding to the resource effective utilization degree based on the resource effective utilization degree and a first calibration table, wherein the first calibration table comprises at least one resource effective utilization degree, at least one score, and a correspondence between the at least one resource effective utilization degree and the at least one score in the first calibration table;

determine a second score corresponding to the resource risk level based on the resource risk level and a second calibration table, wherein the second calibration table comprises at least one resource risk level, at least one score, and a correspondence between the at least one resource risk level and the at least one score in the second calibration table; and use a score obtained by performing a weighted summation on the first score, the weight corresponding to the resource effective utilization degree, the second score, and the weight corresponding to the resource risk level as the health assessment result of the data resource.

10. The electronic device according to claim 9, wherein the health assessment indicator further comprises a use value degree of the data resource, and the use value degree of the data resource is used to indicate a relationship between a resource output and a resource input of the data resource; and the one or more processors further cause the electronic device to:

obtain a weight corresponding to the use value degree; and obtain the health assessment result of the data resource based on the resource effective utilization degree, the resource risk level, the use value degree, the weight corresponding to the resource effective utilization degree, the weight corresponding to the resource risk level, and the weight corresponding to the use value degree.

11. The electronic device according to claim 9, wherein the data resource is used to construct a data warehouse model in a data warehouse, the data warehouse model is used to store data, and the one or more processors further cause the electronic device to:

determine a quotient of a number of first data warehouse models and a total number of data warehouse models as an asset concentration of the data resource, wherein the asset concentration is used to indicate the resource output of the data resource;

determine a quotient of a total data storage amount of the data warehouse and a data storage amount of an operational data store layer in the data warehouse as a cost input coefficient of the data resource, wherein the operational data store layer is used to store source data of a service system, and the cost input coefficient is used to indicate the resource input of the data resource; and determine a quotient of the asset concentration and the cost input coefficient as the use value degree of the data resource, wherein one or more of following conditions are satisfied for the first data warehouse models:

a number of downstream users of the first data warehouse model exceeds a target number, an indicator obtained by the first data warehouse model is a target indicator, and data of the first data warehouse model is visually displayed.

12. The electronic device according to claim 9, wherein the one or more processors further cause the electronic device to:

when a total resource amount of the data resource is greater than a target resource amount, determine that the weight corresponding to the resource effective utilization degree is greater than the weight corresponding to the resource risk level; or when a ratio of a resource usage amount of the data resource to the total resource amount of the data resource is greater than a target ratio, determine that the weight corresponding to the resource effective utilization degree is less than the weight corresponding to the resource risk level.

13. The electronic device according to claim 9, wherein the one or more processors further cause the electronic device to:

input the resource effective utilization degree, the resource risk level, the weight corresponding to the resource effective utilization degree, and the weight corresponding to the resource risk level into a data resource health assessment model, and obtaining the health assessment result of the data resource output by the health assessment model;

wherein the data resource health assessment model is obtained by performing training based on sample data and a label value corresponding to the sample data, the sample data comprises a historical resource effective utilization degree, a historical resource risk level, a weight corresponding to the historical resource effective utilization degree, and a weight corresponding to the historical resource risk level, and the label value of the sample data is an actual health assessment result.

14. The electronic device according to claim 9, wherein the resource effective utilization degree is determined based on a data resource use event corresponding to the data resource and a resource effective use calibration relationship, and the resource risk level is determined based on the data resource use event and a resource use risk calibration relationship, the resource effective use calibration relationship comprises a correspondence between at least one data resource use event and at least one resource effective utilization degree, and the resource use risk calibration relationship comprises a correspondence between at least one data resource use event and at least one resource risk level;

the one or more processors further cause the electronic device to:

determine a first data resource use event with a resource effective utilization degree lower than a target effective utilization degree and a second data resource use event with a resource risk level higher than a target risk level; and analyze the first data resource use event and the second data resource use event, and updating a data resource use standard based on an analysis result, wherein the data resource use standard comprises data resource use events for healthy use of the data resource.

15. The electronic device according to claim 14, wherein the one or more processors further cause the electronic device to:

when the first data resource use event is a data storage resource use event, perform data resource governance based on a data storage resource governance manner in a data storage resource governance calibration relationship; or when the first data resource use event is a data computing resource use event, perform data resource governance based on a data computing resource governance manner in a data computing resource governance calibration relationship, wherein the data storage resource governance calibration relationship comprises a correspondence between at least one data storage resource use event and at least one data storage resource governance manner, and the data computing resource governance calibration relationship comprises a correspondence between at least one data computing resource use event and at least one data computing resource governance manner.

16. The electronic device according to claim 14, wherein the one or more processors further cause the electronic device to:

when the first data resource use event is a target data storage resource use event, perform release assessment on target data resource used corresponding to the first data resource use event or part of the data resource in the target data resource, to obtain a release assessment result, wherein the target data storage resource use event is an event with the resource effective utilization degree lower than the target effective utilization degree because an access frequency of data using the data resource is lower than a target frequency; and when the release assessment result is a positive result, release the target data resource or the part of the data resource in the target data resource.

17. A non-transitory computer-readable storage medium having a computer program stored thereon, wherein the computer program, when executed by a processor, causes a data resource health maintenance method to be implemented, wherein the data resource health maintenance method comprises:

obtaining a health assessment indicator for assessing health of the data resource, wherein the health assessment indicator comprises a resource effective utilization degree and a resource risk level of the data resource in a use process, the resource effective utilization degree is used to indicate a degree to which the data resource is effectively used, the resource risk level is used to indicate a degree of negative impact of use of the data resource on a service, and the resource effective utilization degree is negatively correlated with a rising rate of the resource risk level;

determining a weight corresponding to the resource effective utilization degree and a weight corresponding to the resource risk level;

obtaining a health assessment result of the data resource based on the resource effective utilization degree, the resource risk level, the weight corresponding to the resource effective utilization degree, and the weight corresponding to the resource risk level; and obtaining a data resource use event related to the health assessment result, and performing data resource governance based on the data resource use event;

wherein the obtaining a health assessment result of the data resource based on the resource effective utilization degree, the resource risk level, the weight corresponding to the resource effective utilization degree, and the weight corresponding to the resource risk level, comprises:

determining a first score corresponding to the resource effective utilization degree based on the resource effective utilization degree and a first calibration table, wherein the first calibration table comprises at least one resource effective utilization degree, at least one score, and a correspondence between the at least one resource effective utilization degree and the at least one score in the first calibration table;

determining a second score corresponding to the resource risk level based on the resource risk level and a second calibration table, wherein the second calibration table comprises at least one resource risk level, at least one score, and a correspondence between the at least one resource risk level and the at least one score in the second calibration table; and using a score obtained by performing a weighted summation on the first score, the weight corresponding to the resource effective utilization degree, the second score, and the weight corresponding to the resource risk level as the health assessment result of the data resource.

18. The storage medium according to claim 17, wherein the health assessment indicator further comprises a use value degree of the data resource, and the use value degree of the data resource is used to indicate a relationship between a resource output and a resource input of the data resource; and the obtaining a health assessment result of the data resource based on the resource effective utilization degree, the resource risk level, the weight corresponding to the resource effective utilization degree, and the weight corresponding to the resource risk level, comprises:

obtaining a weight corresponding to the use value degree; and obtaining the health assessment result of the data resource based on the resource effective utilization degree, the resource risk level, the use value degree, the weight corresponding to the resource effective utilization degree, the weight corresponding to the resource risk level, and the weight corresponding to the use value degree.

* * * * *